May 31, 1938.  R. C. MERCER  2,118,854
FILM PATCH
Filed Feb. 25, 1936
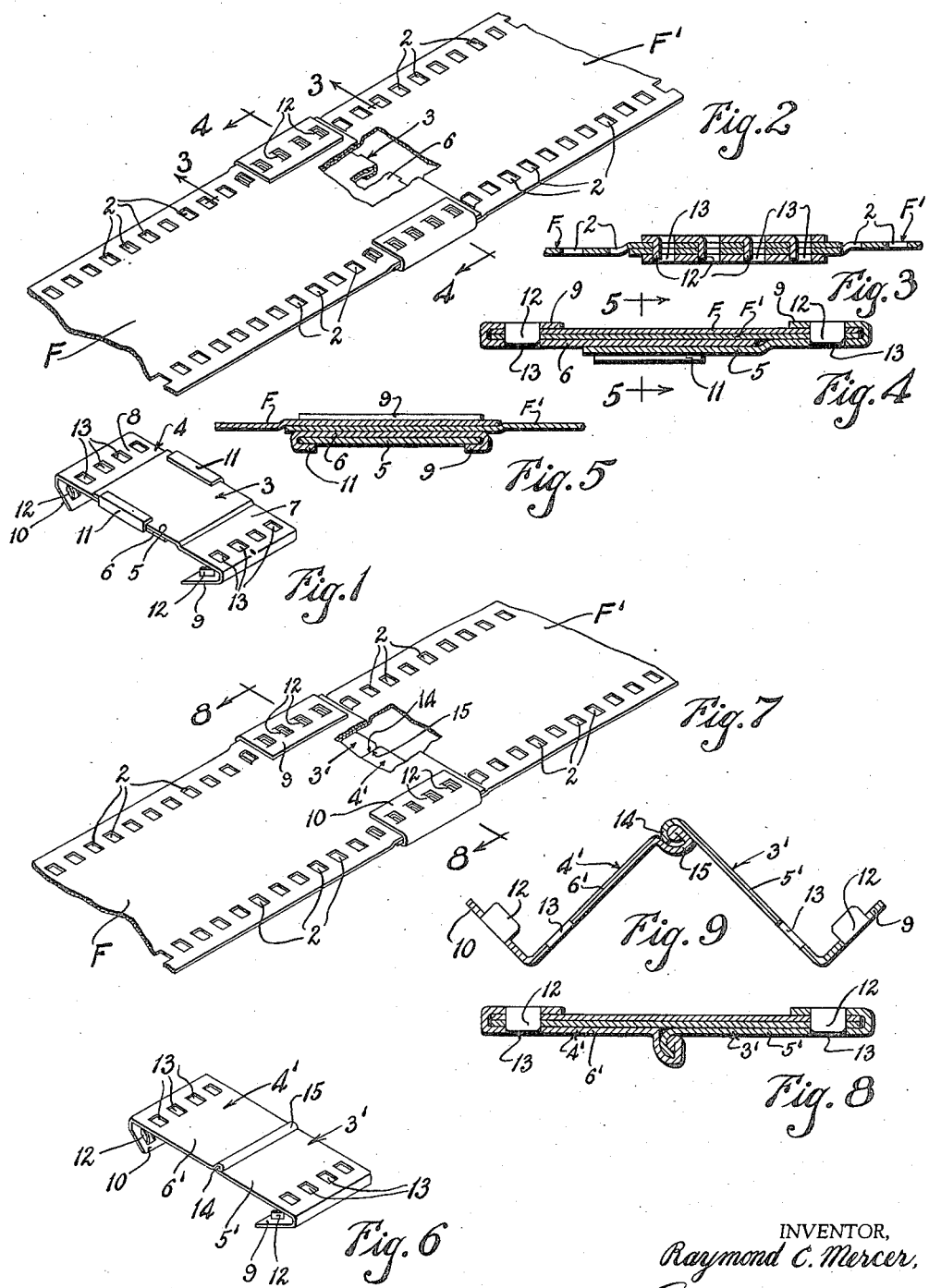
INVENTOR,
Raymond C. Mercer,
BY
ATTORNEY.

Patented May 31, 1938

2,118,854

UNITED STATES PATENT OFFICE 2,118,854

FILM PATCH

Raymond C. Mercer, Los Angeles, Calif.

Application February 25, 1936, Serial No. 65,570

6 Claims. (Cl. 88—19.5)

This invention relates to film patches of the general character disclosed in Letters Patent of the United States granted to me on the 30th day of August, 1921, No. 1,389,523, but embodying certain desirable and necessary improvements thereover, by means of which the adjacent ends of strips of film such as is used in production of motion pictures and the like may be held together, as when cut or broken.

The primary object of my invention is to provide a film patch made of metal, celluloid or the like, or of other suitable material and comprising at least a pair of members adjustable one upon the other for facilitating the application of the patch to films, each of said members having teeth at their outer extremities adapted to register with and to extend through the marginal sprocket perforations of overlapped sections of film for the purpose of holding said sections together during use.

Another object is to so form the outer ends and the teeth thereon that the two members of each patch may be clinched together over the marginal portions of the film sections and thereby be prevented from accidental displacement, the outer portions of said members being bent inwardly over the adjacent portions for such a purpose.

Another object is to provide a film patch which is adjustable in length crosswise of the film so as to be readily adaptable to films of varying width and to better facilitate the placement of the patches on films of the same width. Still other objects may appear as the description progresses.

I have shown in the accompanying drawing two forms of my improved film patch apart from and in position on the overlapped sections of films, subject, however, to modification, within the scope of the appended claims, without departing from the spirit of my invention. In said drawing:

Fig. 1 is a perspective view of one form of film patch composed of two members one of which is slidable on the other for adjusting the length of the patch;

Fig. 2 is a perspective view of the same, in reversed position, applied to the overlapping ends of a pair of film sections;

Fig. 3 is a longitudinal section of the same on line 3—3 of Fig. 2;

Fig. 4 is a transverse section of the same on line 4—4 of Fig. 2;

Fig. 5 is a section on line 5—5 of Fig. 4;

Fig. 6 is a perspective view of another form of patch comprising a pair of members hingedly connected;

Fig. 7 is a perspective view of the same applied to the overlapping sections of a film as in Fig. 1;

Fig. 8 is a section of the alternate form of patch on line 8—8 of Fig. 7; and

Fig. 9 is an enlarged view of the same form of patch showing the members thereof disposed at an angle from their operative plane.

As usual in such devices they are adapted for application flatwise to overlapped sections of film as at F and F' so that the teeth on the ends of the patches may extend through the sprocket perforations 2, 2, etc. provided on the marginal portions of the films. The form of patch shown in Figs. 1 to 5 inclusive includes a pair of members 3 and 4 which are relatively slidable one on the other and have flat body portions 5 and 6, respectively, corresponding marginal portions 7 and 8 and inwardly bent attaching portions 9 and 10.

One of the members may have portions 11, 11, bent upwardly and over the body thereof for providing guide channels in which the other member is longitudinally adjustable, as shown in Fig. 1. Both members have teeth 12 bent inwardly from the attaching portions 9 and which are spaced apart to correspond to the spacing of the sprocket perforations 2 in the films. Portions 7 and 8 of said members have apertures 13 in registration with and adapted to receive the teeth 12 when the attaching portions are bent upwardly into contact with the surfaces of the film sections. Thus the teeth 12 extend through the perforations 2 of the film sections and also into the apertures 13 of the patch members, thereby clinching the patch on the film and preventing its displacement during use.

The optional form of device shown in Figs. 6 to 9 inclusive serves the same purpose as the form just described and is similar to the other form in that it embodies a pair of members 3' and 4' which instead of being slidable adjustable one on the other are pivotally adjustable, as shown in Fig. 6 particularly. This form of patch has its flat body portions 5' and 6' hingedly connected by curling the inner ends of said members as at 14 and 15 to provide a hinged joint as shown in enlarged form in Fig. 8. The marginal portions of the bodies are formed with the apertures 13, as in Fig. 1, and the attaching portions 9 and 10 are formed on said members and have teeth 12 corresponding to the form shown in Fig. 1.

The second form described is applied to the films before the attaching portions are bent at too acute an angle after which said portions are bent inwardly and clinched over the edges of the film section as in the case of the form shown in Fig. 1. The joint between the members 3' and 4' may be formed so as to provide a type of joint which will not permit the flexing of the patch during use, as illustrated in Fig. 8, the end of the curl 14 of one member being limited by engagement with the socket in the curl 15 of the other member, or otherwise.

In both forms of device the advantages and desirability will be readily appreciated by those skilled in the motion picture art, for the reason that single piece patches frequently break, especially the teeth thereon and must be replaced, or they may be accidentally displaced from a film in some instances to the disadvantage and inconvenience of an operator. The forms of patch shown herein are not susceptible to any such or other usual disadvantages and can be removed from the film only by bending the attaching portions outwardly so as to disengage the teeth 12 from the film sections and the patch body portions.

What I claim, is:

1. A film patch comprising: a plurality of members adjustably connected and having means on opposite portions thereof for engagement with the sprocket perforations of adjacent sections of a film for holding said sections together for use, said members having portions adapted to overlie the edges of said film sections and to engage opposite surfaces thereof for clinching said sections.

2. A film patch comprising: a pair of members, means connecting said members for longitudinal adjustment one upon the other and transversely of the film, and means at the ends of said members for engagement with the sprocket perforations of adjacent sections of a film for attaching said sections together.

3. A film patch comprising: a pair of members adjustably connected and adapted to overlie adjacent sections of a film, said members having end portions adapted to be bent around the edges of and to underlie said film sections, and means on said end portions for engagement with the sprocket perforations of said film for operatively connecting said film sections.

4. A film patch comprising: a pair of members adjustably connected at an intermediate point and adapted to overlie adjacent sections of a film, said members having end portions adapted to be bent around the edges of and to underlie said film sections, and means on said end portions for engagement with the sprocket perforations of said film for operatively connecting said film sections, said means including teeth formed on said end portions.

5. A film patch comprising: a pair of members adjustably connected at an intermediate point and adapted to overlie adjacent sections of a film, said members having end portions adapted to be bent around the edges of and to underlie said film sections, and means on said end portions for engagement with the sprocket perforations of said film for operatively connecting said film sections, said means including teeth formed on said end portions, and apertures in registration with and for receiving said teeth.

6. A film patch comprising: a member having a sectional body adapted to overlie and extend entirely across a section of film transversely thereof and an extension therefrom adapted to underlie said film, means on said extension for engagement with the sprocket perforations on said film for attaching said member in position for use, and means connecting said body sections for relative adjustment.

RAYMOND C. MERCER.